May 21, 1957 P. TENENBAUM 2,793,068
TRAILER BODY REAR DOOR CORNER CONSTRUCTION
Filed June 15, 1956 3 Sheets-Sheet 1

INVENTOR.
PAUL TENENBAUM
BY
ATTORNEY

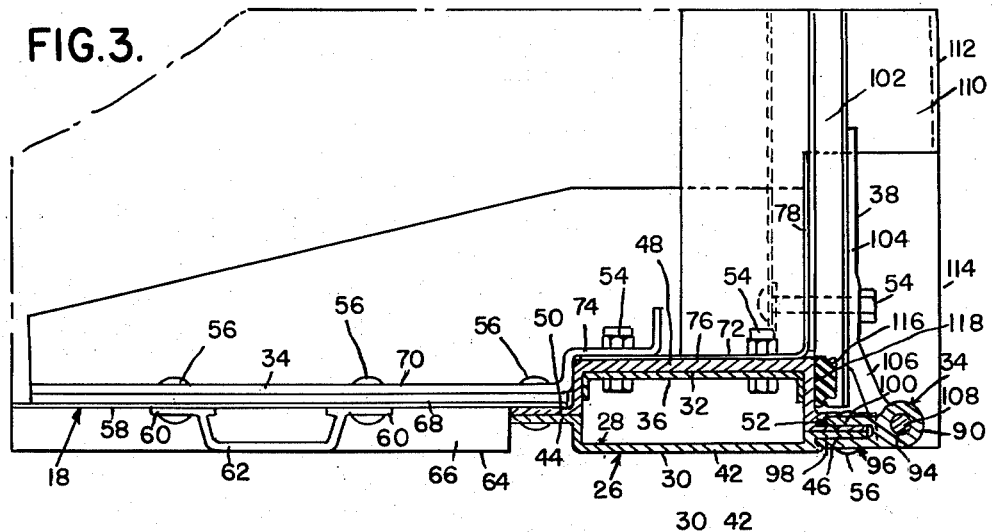

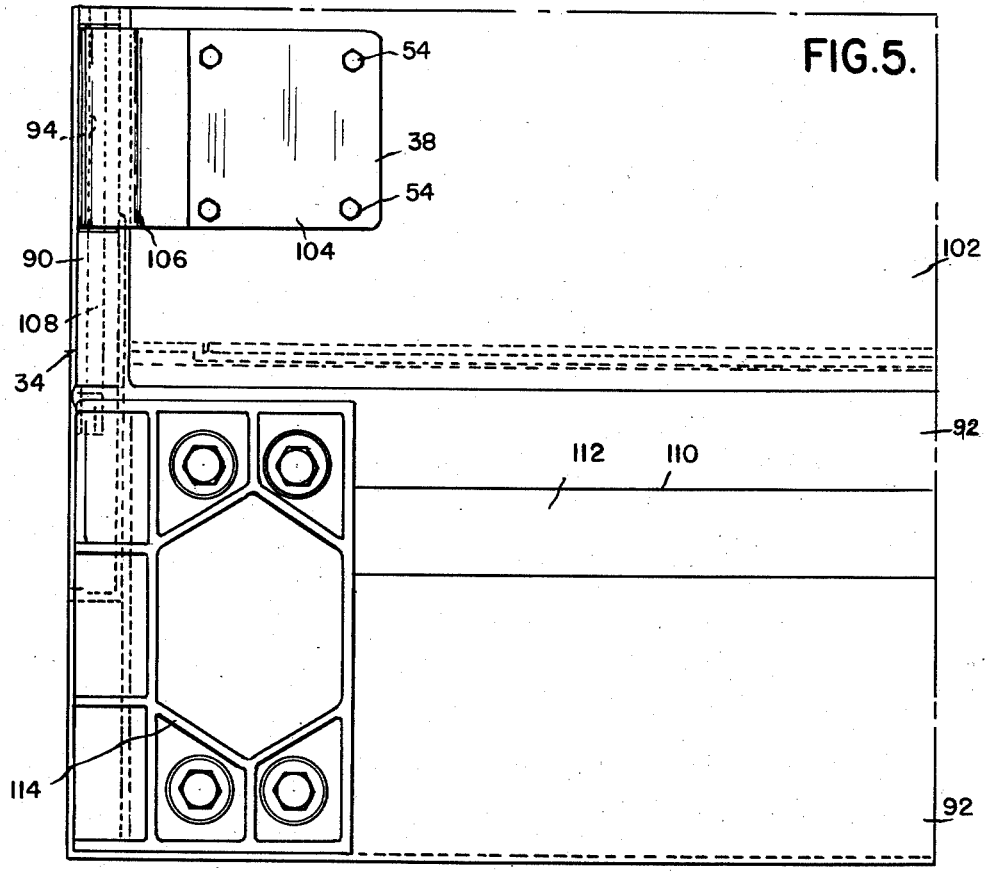
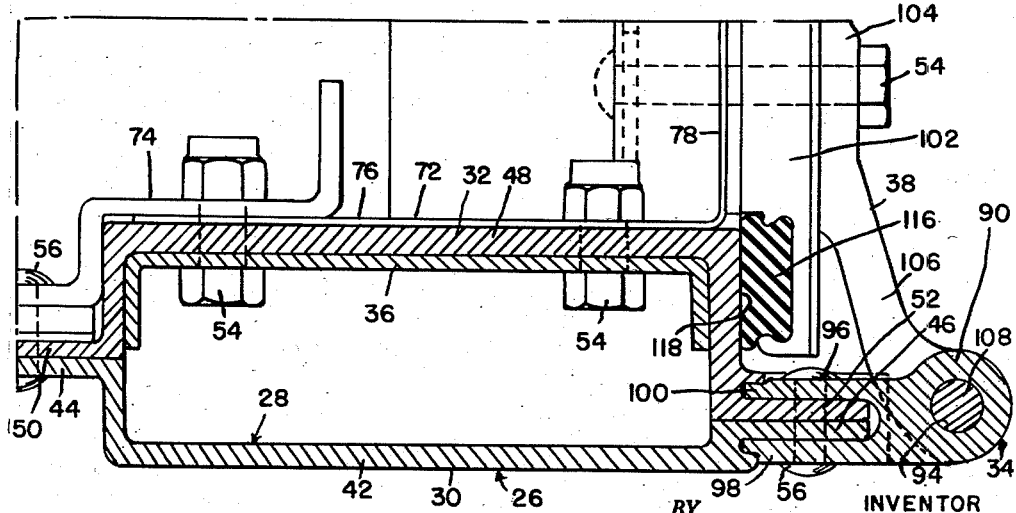
FIG.5.
FIG.6.

2,793,068
Patented May 21, 1957

2,793,068
TRAILER BODY REAR DOOR CORNER CONSTRUCTION

Paul Tenenbaum, Oak Park, Mich., assignor to Copco Trailer Division, Centerline, Mich., a division of Copco Steel & Engineering Co., Detroit, Mich., a corporation of Michigan Application June 15, 1956, Serial No. 591,596

4 Claims. (Cl. 296—28)

This invention relates to a trailer construction and more particularly to the rear end corner post structure of a tractor hauled trailer.

In van type trailers of the type here involved, the rearward end of the trailer is generally subjected to more severe treatment than other parts of the trailer. This is due primarily to the fact that these trailers are backed into stalls, or docks, or loading platforms of all sizes and descriptions. Very often, these loading or unloading areas are not arranged to complement the height or size of the trailer, its floor or its doors. Thus, damage to the doors, the corner posts, the floor sill and other rear end portions frequency results.

Another consideration involved in the rear end construction, and particularly the corner post portion thereof, is that of weight and strength. Because freight-type common carrier trailers must meet state and federal highway restrictions, and at the same time carry profit paying loads, every feature of trailer construction, including the rear corner posts, must be relatively light in weight and high in strength. This combination is often difficult to achieve.

However, by the unique and inventive construction here disclosed, the rear corner posts of a tractor-hauled trailer combine exceptionally great strength with a minimum of weight. In addition, this corner post construction provides for continuous protection for the hinged edge of the door because that edge is protected by a continuous hinge portion that projects rearwardly of the door edge, i. e. it is offset rearwardly of the plane of the door. A second major advantage of the instant construction is that shock to the rearward door portion of the trailer is distributed over a wider area, lessening the impact injury at any single portion of the door edge at the hinge. Since ingress to and egress from the trailer is via the rear doors, it must therefore be appreciated that trailer door protection is of great importance. One feature of the construction is the inclusion of a box-type 3-piece corner post, one portion of which is an arm for a butt yoke hinge having an offset barrel. Another feature is the provision of a pair of complementary corner members having offset flanges adapted to combine with both the side walls and the rear door hinge. A further feature and object of the invention is to provide a high strength, distortion resistant hinge arm in combination with the corner post.

These and additional features of construction and objects of the invention will become more apparent from the description of the invention given below, in which the terms are used for purposes of description and not of limitation.

Referring now to the drawings annexed hereto and forming a part of the specification, showing a preferred embodiment of the invention, Fig. 1 is a side elevation, of reduced scale, of a tractor-hauled trailer in which the invention has been embodied.

Fig. 3 is a slightly enlarged, horizontal, sectional view taken substantially on the line 3—3 of Fig. 2.

Fig. 4 is a slightly enlarged vertical side elevational view of the portion shown in Fig. 3.

Fig. 5 is a slightly enlarged fragmentary elevational view of the rear end portion of the trailer taken at the lower left corner of Fig. 2.

Fig. 6 is a somewhat enlarged horizontal sectional view of the principal components of the inventive corner post shown in Fig. 3.

Figure 1:
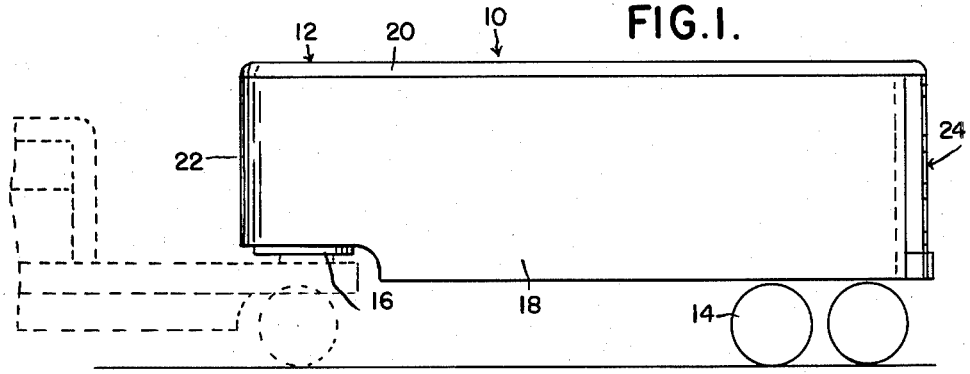
Figure 2:
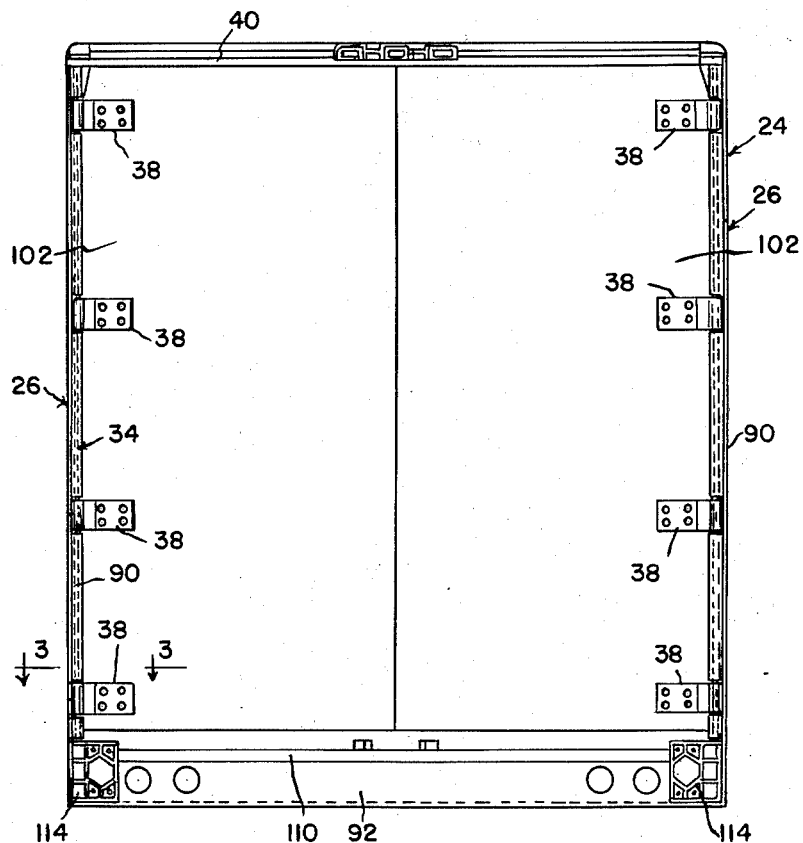
Fig. 2 is a rear end elevation of the trailer shown in Fig. 1.

As shown in the several views of the drawings, the trailer 10 comprises a body portion 12 mounted on an undercarriage (not shown), which is supported on axle mounted wheels 14 at the rearward end and on a fifth wheel structure 16 at the forward end thereof. The trailer body 12 comprises a pair of spaced apart vertical side walls 18, a top 20, a forward wall 22 and a rear end structure designated generally as 24.

The invention involves the corner post structure 26 which comprises a corner box 28 composed of an outer member 30 and an inner member 32, a corner door hinge 34, a corner box stiffening member 36, and door hinge plates 38.

The horizontal sectional view of Fig. 3 is taken at or slightly above the interior floor level so that it represents the base portion of the corner post structure 26. However, it is to be understood that the structure 26 continues upward, as shown, to the top rail 40 of the rear end structure 24.

Essentially, the corner post 26 is arranged as follows. Outer member 30 is provided with a channel portion 42, a forward flange 44 and a rearward flange 46. These flanges do not lie in the same plane but are offset somewhat with respect to each other. The inner member 32 is also provided with a channel portion 48, a forward flange 50, and a rearward flange 52, offset from each other and arranged to match with the outer member flanges 44 and 46 respectively, so that when the outer and inner corner members are matched the channels 42 and 48 form a rectangular box section and the forward and rearward flanges of each form contiguous unitary flanges, as will be explained and described further below.

At and below trailer floor level, the side walls 18 and the rear end structural members here described are affixed to the trailer framing preferably by nuts and bolts, 54. Above the trailer floor line, these members are preferably affixed by rivets 56.

Side wall 18 is constructed of coplanar panel sheets 58, butted together and affixed to the flanges 60 of the wall ribs 62 by bolts 54 and rivets 56. At the bottom of the wall, the reinforced side wall is mounted by bolts on an angular side sill 64 having a horizontal element 68. A gusset plate 70 and an auxiliary gusset angle 72 are provided to anchor and support the corner post structure 26 at the bottom thereof to the trailer framing.

The corner post 26 is mounted at its forward end by bolts 54 below the trailer floor line, by passing the bolts through the two forward flanges 44 and 50, the sidewall panel sheet 58, the sill upstanding flange 68 and the gusset plate 70. The gusset plate 70 is provided with an offset portion 74 that conforms to the channel portion 48 of the inner member 32. The auxiliary gusset angle 72, having two side legs 76 and 78, has its leg 76 arranged directly upon the inner member channel 48 and underneath the gusset offset portion 74. Thus, when the corner post is anchored in place, bolts 54 pass through stiffening member 36, channel 48, gusset leg 76 and gusset offset portion 74 at the forward end, and through the same elements, except the offset portion 74, at the rearward end of the inner member channel 48.

The corner door hinge 34 comprises a butt portion 90 extending the entire height of the door area from the rear sill 92 to the top rail 40. The butt 90 has a longitudinal bore 94 at its rearward portion and a yoke 96 at its forward portion. The yoke 96, consisting of legs 98 and 100, slip over the flanges 46 and 52 of the outer and inner members, 30 and 32 respectively, where the butt is affixed firmly by rivets 56. Spaced at appropriate and suitable intervals from the bottom sill 92 to the top rail 40 are the door hinge plates 38, which are arranged to mount upon the door panels 102 inwardly of the rear line of the hinge butt portion 90. The hinge plates 38, having a door mounting portion 104, affixed to the door panels 102 by bolts 54, are provided with an offset leg portion 106 having a bore at its outermost end that receives the hinge pin 108 which extends the entire length of the door hinge butt 90. In this way, the door hinge 34 is substantially a solid member providing great strength at the rear and outer edge of the door and distributing the shock and damage of impact over a much wider area than is present in current construction. In addition, a blow or shock upon the hinge 34 is not necessarily communicated to the door panel 102, which is set inwardly and forwardly of the hinge butt 90, preventing door jams which occasion lost time spent for repairs and maintenance.

Below the door panels 102, the rear sill 92 of channel form extends from one side to the other of the trailer body 12. A channel bumper 110 is affixed to the rear sill, having its web 112 lying substantially in the same plane as the corner bumper casting 114 mounted at the end of the rear sill 92.

The usual construction of door panels, such as 102, provides for the inclusion of a rubber seal or gasket 116 which is arranged at the outer edge of the door panel facing inwardly of the trailer body. In order to provide a sealing seat for the seal 116, the rearwardly directed longitudinal corner post flanges 46 and 52 are offset with respect to the plane of the forwardly directed flanges 44 and 50 a distance sufficient to provide a positive seat portion 118 on the rearward side of channel 48 of inner member 32.

The corner post structure 26 here disclosed embodies a butt yoke hinge having an offset barrel arrangement mounted on a hollow box section of exceptional strength and light weight. It protects the door panels 102 at their most vulnerable point, the hinge area, and it distributes the shock of impact over a greater portion of the hinge instead of taking it in a single concentrated area. In addition, the continuous protection afforded the outer edge of the door panel by the hinge butt 90 reduces to an absolute minimum the possibility of doors jamming at this line.

In operation, the door panels 102 are protected at their outer hinge areas by the butt portion 90 which projects beyond the plane of the door panels to offer protection thereto. The doors are pivoted on the hinge pin 108 which runs continuously the length of the butt portion 90. The hinge butt 90 is positively anchored to the corner post 26 by its yoke 96 which fits smoothly and closely over the rearward flanges of the outer and inner corner post members 30 and 32, and to which it is affixed by suitable rivet fasteners.

The corner post members 30 and 32 are affixed to the side wall panels 58, the side wall sill 64 and to the trailer framing by gusset plate 70 and the auxiliary gusset angle 72. The gusset plate 70 and the gusset angle 72 are anchored and firmly affixed to the trailer framing by bolts 54 and welding, so that the corner post 26 is provided wtih positive support and anchorage.

Having described the invention in its simplest terms, it is to be understood that features of construction may be varied in greater or lesser degree without departing from the essence of the invention.

I claim:

1. In a vehicle body of the load carrying type, in combination, a framing for said body, side walls mounted on said framing, rear end corner posts mounted on said framing, and rear end doors for said body pivotally mounted on said corner posts, each of said corner posts comprising a pair of matched complementary channel members forming a hollow tubular door support mounted at its base and at its upper end to said framing, said channel members having forwardly directed contiguous parallel flanges affixed to said side wall and rearwardly directed contiguous parallel flanges, a hinge for each of said doors comprising a butt portion terminating at one edge in a yoke arranged to receive said rearwardly directed flanges therewithin, said butt yoke and said latter flanges being fixedly conjoined to form a hinge arm for said door, said hinge butt portion having a bore therethrough and a hinge pin in said bore, and hinge plates pivotally mounting said door on said corner posts, each of said hinge plates having a door mounting portion and an offset portion having a bore therethrough, said hinge butt portion being notched to receive said hinge plate offset portion, said hinge pin passing through said hinge plate bore to provide a pivoting mount for said door, said hinge butt being rearward of the plane of said door to provide a protecting buffer for said door.

2. In a vehicle body of the load carrying type, in combination, a framing for said body, side walls mounted on said framing, rear end corner posts mounted on said framing, and rear end doors for said body pivotally mounted on said corner posts, each of said corner posts comprising a pair of matched complementary channel members forming a hollow tubular door support mounted at its base and at its upper end to said framing, said channel members having forwardly directed contiguous parallel flanges affixed to said side wall and rearwardly directed contiguous parallel flanges offset from said forwardly directed flanges, a hinge for each of said doors comprising a butt portion terminating in a yoke arranged to receive said rearwardly directed flanges closely therewithin, said butt yoke and said latter flanges being fixedly conjoined to form a hinge arm for said door, said hinge butt portion having a bore therethrough and a continuous hinge pin in said bore throughout the length thereof, and hinge plates affixed to said door pivotally mounting said door on said corner post, each of said hinge plates having a door mounting portion lying flush with the surface of said door and a rearwardly offset portion having a bore therethrough, said hinge butt portion being notched to receive said hinge plate offset portion, said hinge pin passing through said hinge plate bore to provide a pivoting mount for said door, said hinge butt being rearward of the plane of said door to provide a protecting buffer for said door at the outer edge thereof.

3. In a vehicle of the load carrying type, in combination, a framing for said body, side walls mounted on said framing, rear end corner posts mounted on said framing, and rear end doors for said body pivotally mounted on said corner posts, each of said corner posts comprising a pair of matched complementary channel members forming a door support mounted at its base and at its upper end to said framing, said channel members having forwardly directed longitudinal contiguous parallel flanges affixed to said side wall and rearwardly directed longitudinal contiguous parallel flanges offset from said forwardly directed flanges, a hinge for each of said doors comprising a butt portion terminating at one edge in a yoke arranged to receive and encompass said rearwardly directed flanges, said butt yoke and said latter flanges being fixedly conjoined to form a hinge arm for said door, said hinge butt portion having a longitudinal continuous bore therethrough and a continuous hinge pin in said bore throughout the length thereof, and hinge plates affixed to said door pivotally mounting said door on said corner post, each of said hinge plates having a door mounting portion lying flush with the surface of said door and a rearwardly offset portion having a bore therethrough, said hinge butt portion being notched to receive the end of said hinge plate offset portion, said hinge pin passing through said hinge plate bore to provide a pivoting mount for said door, said hinge butt portion being rearward of the plane of said door a distance sufficient to provide a protecting buffer for said door at the outer edge thereof.

4. In a vehicle body of the load carrying type, in combination, a framing for said body, side walls mounted on said framing, rear end corner posts mounted on said framing, and rear end doors for said body pivotally mounted on said corner posts, each of said corner posts comprising a pair of matched complementary contiguous channel members forming a tubular door support mounted at its base and at its upper end to said framing, said channel members having forwardly directed longitudinal continuous contiguous flanges affixed to said side wall and rearwardly directed longitudinal continuous contiguous flanges, a hinge for each of said doors comprising a butt portion terminating along one edge in a yoke arranged to closely receive and encompass said rearwardly directed flanges, said butt yoke and said latter flanges being fixedly conjoined to form a hinge arm on said door support for said door, said hinge butt portion having a longitudinal continuous bore therethrough and a continuous hinge pin in said bore throughout its length, and hinge plates affixed to said door pivotally mounting said door on said corner post, each of said hinge plates having a door mounting portion flush with the surface of said door and a rearwardly offset portion having a bore therethrough, said hinge butt portion being notched to receive the end of said hinge plate offset portion, said hinge pin passing through said hinge plate bore to provide a pivoting mount for said door, said hinge butt portion being rearward of the plane of said door a distance sufficient to provide a protecting buffer for said door at the outer edge thereof.

References Cited in the file of this patent
UNITED STATES PATENTS

| | | |
|---|---|---|
| 1,462,657 | Rainalter | July 24, 1923 |
| 1,930,635 | Wessling | Oct. 17, 1933 |
| 2,609,069 | McLaughlin | Sept. 2, 1952 |